Sept. 2, 1969     O. FRIBERG     3,464,082
CONTAINER WITH DETACHABLE HANDLE
Filed March 16, 1967     2 Sheets-Sheet 1

INVENTOR
OSCAR FRIBERG
BY *James M. Heilman*
ATTORNEY

Sept. 2, 1969　　　　　O. FRIBERG　　　　3,464,082
CONTAINER WITH DETACHABLE HANDLE
Filed March 16, 1967　　　　　　2 Sheets-Sheet 2

INVENTOR
OSCAR FRIBERG
BY James M. Heilman
ATTORNEY

United States Patent Office 3,464,082
Patented Sept. 2, 1969

3,464,082
CONTAINER WITH DETACHABLE HANDLE
Oscar Friberg, Avenue de France 24,
Lausanne, Switzerland
Filed Mar. 16, 1967, Ser. No. 623,750
Int. Cl. B65d 25/28
U.S. Cl. 16—114            2 Claims

ABSTRACT OF THE DISCLOSURE

A detachable handle for a container comprising a latching element permanently secured to a container and a handle containing a slidable latch whereby the two latching elements may be coupled together.

---

This invention relates to containers with detachable handles. More specifically the invention is especially applicable to domestic utensils such as pans but it will be understood that it may be used for other purposes in an analogous manner.

It is therefore an object of this invention to provide a new and useful container with detachable handle.

Another object of the invention is to provide a container with detachable handle which is easy to manufacture and which will remedy the drawbacks of the containers having handles permanently secured thereto.

A further object of this invention is to provide a container with detachable handle which is easy to use, which is particularly safe and reliable, and which can be operated with one hand.

According to feature of the invention there is provided a container with removable handle comprising a sliding coupling device a part of which is permanently secured to an outer side of the container, the other part of said coupling device being fixed to the handle in which is located a slidable latch means for locking both parts of the coupling device when they are mating.

In accordance with a preferred embodiment of the invention, the male member of the sliding coupling device is fixed to the container and the female member of the coupling device is fixed to the handle. The male member of the coupling device comprises an upper horizontal cut down portion against which abuts the upper edge of the female member which is fixed to the handle, and the latch means comprises a raised tongue like strip projecting above the female member and which is adapted to slide over said horizontal cut down portion of the male member for locking the two members of said sliding coupling device.

Other features and advantages of this invention will become apparent from the following description and drawings.

Figure 1:
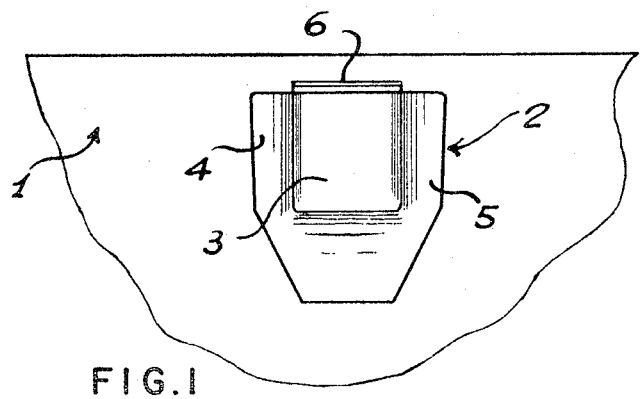
FIGURE 1 is a partial view in elevation showing the container.
Figure 2:
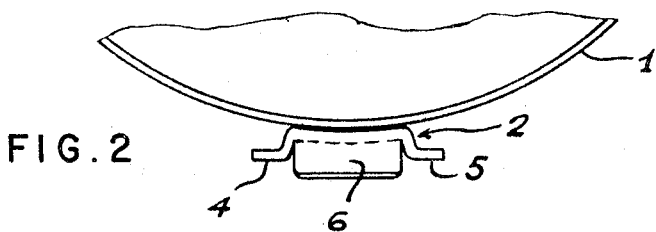
FIGURE 2 is a plan view of FIGURE 1.
Figure 3:
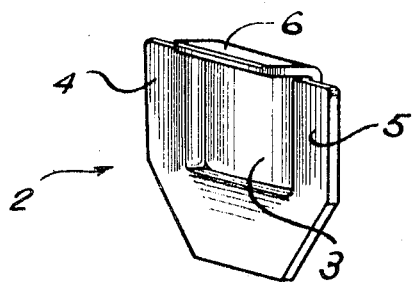
FIGURE 3 is a perspective view showing the male member of the coupling device.

The container 1 (see FIGURES 1 and 2) supports the male member 2 of the sliding coupling device. Said male member 2 is secured to the outer side of the container 1 by welding or by any other suitable way. Male member 2 (see FIGURE 3) is formed by a plate presenting a bottom 3, two lateral vertical wings or flanges 4 and 5 and an upper horizontal cut down portion 6. The male member 2 may be made by stamping or any other convenient manner, and it may even be made all in one piece with the container.

Figure 4:
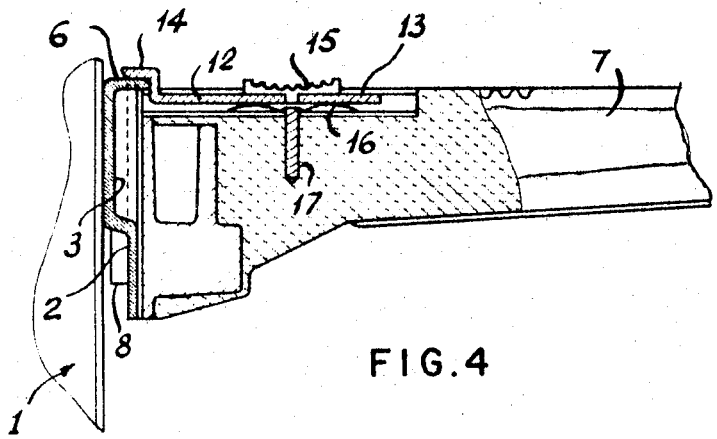
FIGURE 4 is a partly sectional side elevation of the container with its handle.
Figure 5:
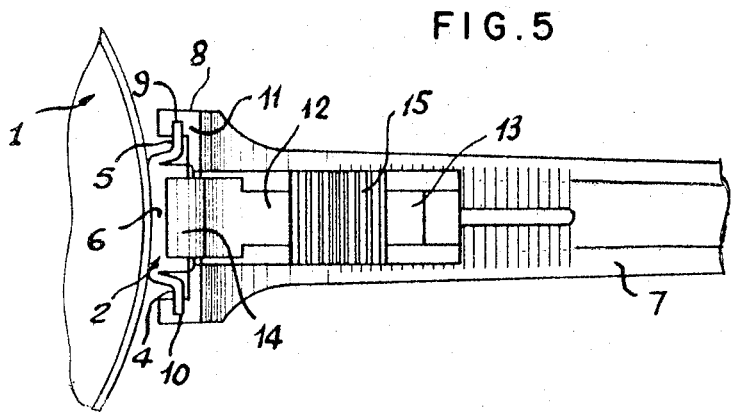
FIGURE 5 is a plan view of FIGURE 4.

The reference numeral 7 designates the handle (see FIGURES 4 and 5) the forepart of which supports the female member 8 of the sliding coupling deivce. The member 8 comprises two slots 9 and 10 which are adapted to slide on the wings or flanges 4 and 5 of the male member 2, the upper edge 11 of said female member 8 abutting against the upper horizontal cut down portion 6 of male member 2.

The upper portion of handle 7 is grooved and forms a housing in which is located a sliding latch 12 which is formed by an elongated thin plate 13 which is folded so as to present at its front end a raised tongue like strip 14 which is adapted to slide over the horizontal cut down portion 6 of male member 2 when the latch 12 is in its locking condition. On the elongated plate 13 is secured a control knob 15 projecting over the handle 7. A resilient strip 16 is fastened to handle 7 under plate 13. Resilient strip 16 which is secured to the handle 7 by screw 17 (see FIGURE 4) is adapted to restrain the sliding movements of latch 12.

To secure the handle 7 on the container 1, it suffices to place said handle 7 under male member 2 which is permanently fixed to the container 1 and to slide upwardly slots 9 and 10 of female member 8 which is permanently secured to handle 7, on the wings or flanges 4 and 5 of male member 2, until the upper edge 11 of female member 8 abuts against the upper horizontal cut down portion 6 of male member 2. It is then necessary to push forward latch 12 by means of knob 15 until raised tongue like strip 14 slides over the horizontal cut down portion 6, thus locking members 2 and 8 of the sliding coupling and securing handle 7 to the container 1. To remove the handle 7, it suffices to unlock the sliding coupling by displacing latch 12 in the opposite direction for retracting raised tongue like strip 14 which frees the cut down portion 6. It is then possible to slide handle 7 downwards and to detach it from the container 1.

Having thus described the invention it must be understood that various changes in shape, size and rearrangement of details coming within the field of the invention may be effected without departing from the scope of the appended claims.

What is claimed is:

1. A container with detachable handle having a sliding coupling device a part of which is permanently secured to an outer side of said container, the other part of said coupling device being fixed to said handle, a sliding latch located in said handle, said sliding coupling device comprising a male member secured to said container and having an upper horizontal cut down portion against which abuts the upper edge of the female member of said coupling device which is secured to said handle, said sliding latch comprising a raised tongue-like strip projecting above said female member of said sliding coupling device, said raised tongue-like strip being adapated to slide over said horizontal cut down portion of said male member to lock said two members of said sliding coupling device, and said container further comprising a resilient strip fastened to the handle under said sliding latch and adapted to restrain the sliding movement thereof.

2. A container with detachable handle having a sliding coupling device a part of which is permanently secured to an outer side of said container, the other part of said coupling device being fixed to said handle, a sliding latch located in said handle, said sliding coupling device comprising a male member secured to said container and having an upper horizontal cut down portion against which abuts the upper edge of thee female member of said coupling device which is secured to said handle, said sliding latch comprising a raised tongue-like strip projecting above said female member of said sliding coupling device, said raised tongue-like strip being adapted to slide over said horizontal cut-down portion of said male member to lock said two members of said sliding coupling device, and in which said male member of said sliding coupling device having an upper horizontal cut down portion is formed by a stamped plate comprising a bottom, and two lateral vertical flanges, and wherein said female member of said coupling device is provided with spaced forwardly extending projections, and said forwardly extending projections contacting said lateral vertical flanges, and wherein said forwardly extending projections are each provided with a slot opening solely from the top thereof, said slots receiving the lateral flanges to sturdily support said container and wherein said slots closed at their lower end prevent the separation of the coupling device in one direction and said sliding latch prevents the separation of the coupling device in the opposite direction, and in which said sliding latch located in said handle is formed from an elongated thin plate which is folded so as to present at one of its ends a raised tongue-like strip, and said container further comprising a resilient strip fastened to the handle under said sliding latch and adapted to restrain the sliding movement thereof.

References Cited

UNITED STATES PATENTS

| | | |
|---|---|---|
| 691,050 | 1/1902 | Dronne. |
| 730,731 | 6/1903 | Abercrombie. |
| 1,317,715 | 10/1919 | Luttringhaus. |
| 1,525,524 | 2/1925 | Wegenaar. |
| 1,686,497 | 10/1928 | Olsen. |
| 1,818,284 | 8/1931 | Stephens. |
| 2,262,273 | 11/1941 | Ferrara. |

BOBBY R. GAY, Primary Examiner

DORIS L. TROUTMAN, Assistant Examiner